(12) United States Patent
Wu et al.

(10) Patent No.: US 6,480,581 B1
(45) Date of Patent: Nov. 12, 2002

(54) INTERNET/TELEPHONE ADAPTER DEVICE AND METHOD

(75) Inventors: Muh Wu, Taipei (TW); Shun Ho Chung, Taipei (TW); Chia-Chen Yu, Tao Yuan (TW); Kuo-Yu Chuang, Taipei (TW); I-Fang Wu, Taipei (TW)

(73) Assignee: Institute for Information Industry (TW)

( * ) Notice: Subject to any disclaimer, the term of this patent is extended or adjusted under 35 U.S.C. 154(b) by 0 days.

(21) Appl. No.: 09/338,013

(22) Filed: Jun. 22, 1999

(51) Int. Cl.[7] .............................................. H04M 11/00
(52) U.S. Cl. .................... 379/93.01; 379/900; 370/352; 370/354
(58) Field of Search ....................... 379/201.01, 93.01, 379/900; 370/352, 354

(56) References Cited

U.S. PATENT DOCUMENTS

| | | | | |
|---|---|---|---|---|
| 5,572,585 A | * | 11/1996 | Tsutsui | 379/164 X |
| 5,737,333 A | * | 4/1998 | Civanlar et al. | 370/407 X |
| 5,896,512 A | * | 4/1999 | Einbinder et al. | 395/200.8 |
| 6,094,673 A | * | 7/2000 | Dilip et al. | 709/202 |
| 6,151,357 A | * | 11/2000 | Jawahar et al. | 375/228 |
| 6,175,565 B1 | * | 1/2001 | McKinnon et al. | 379/200 X |
| 6,256,620 B1 | * | 7/2001 | Jawahar et al. | 707/2 |
| 6,289,333 B1 | * | 9/2001 | Jawahar et al. | 707/2 |
| 6,298,350 B1 | * | 10/2001 | Jawahar et al. | 707/2 |

\* cited by examiner

Primary Examiner—Creighton Smith (57) ABSTRACT

An Internet/telephone adapter device and method is provided to automatically detect the communication type of an incoming call. The Internet/telephone adapter device comprises an auto-detecting means for providing a mechanism to detect the communication type of an incoming call by means of the feature rings. The feature rings have a predetermined feature distinguishable from non-feature rings. Whenever the auto-detecting means determines the communication type of the incoming call, it sends a control signal to CPU. In response to the control signal, the CPU will automatically switch the linkage to the Internet or to the PSTNs without further human operations.

13 Claims, 6 Drawing Sheets

INTERNET/TELEPHONE ADAPTER DEVICE AND METHOD

BACKGROUND OF THE INVENTION

A. Field of the Invention

The present invention relates to an Internet/telephone adapter device and method, especially to an adapter device and method which can detect the communication types of an incoming call, thereby to automatically switch the communication linkage to a corresponding type of communication without manual operations.

B. Description of the Prior Art

Internet telephony provides the telephone service via Internet. The users can use the bandwidth of the Internet to transfer voice signals as if they are talking over a telephone line. To provide a better QoS, users can subscribe to an Internet Service Provider (ISP). The ISP will provide the user with a special equipment which can be an add-on box to the telephone set. Then, with the equipment, the user can use a dedicated communication line to connect to the ISP server and then use the dedicated communication line for telephone service. The advantage for this Internet telephony service is that it can save lots of money for the users especially when they usually make lots of overseas or long distance calls. However, the disadvantage is that the subscription fee for the dedicated line is still an investment.

Another approach which costs less is using a PC and a MODEM at home to connect to the Internet via a regular telephone line. The user must run a software program on the computer for voice processing so that the voice signals can be processed as packets to be transferred over the Internet. The hardware implementation for the personal computer includes simply a microphone, a speakerphone, and a sound card. For this approach, both caller and callee must know how to implement the software and hardware operations on the computer, and also how to dial-up to the Internet using the MODEM. For users who are not familiar with computer operations, this approach is not feasible. Moreover, the voice quality on the Internet is also very difficult to control because of the heavy traffic flow on the Internet.

Currently, a standalone adapter device is available on the market for providing Internet telephony. The adapter device is like an add-on device to the telephone set. Both the caller and the callee need to implement the adapter device to their telephone sets so that they can choose to make a call via the Internet or the PSTNs (Public Switched Telephone Networks). The disadvantage for this adapter device is that it cannot automatically determine the communication type of an incoming call. Consequently, the caller must make a regular telephone call to the callee first and tell the callee to switch the adapter device to the Internet mode before they can actually talk over the Internet. The standalone adapter device does not need subscription fee for a dedicated communication line. However, the disadvantage is that a notice call is always required. Moreover, if someone else calls right after the notice call and the callee answers the phone, then the caller at the remote site will have to wait and wonder if there is anything wrong with the adapter device or the Internet.

SUMMARY OF THE INVENTION

The primary object of the present invention is to provide an Internet/telephone adapter device which can detect the communication type of an incoming call, and automatically switch the communication linkage to a corresponding communication linkage without manual operations, thereby to make the Internet telephony more convenient to use.

Another object of the present invention is to provide a user-friendly Internet/telephone adapter device to add on to a regular telephone set so that the users can save money on long distance calls or overseas calls by fully utilizing the bandwidth of the Internet.

In accordance with the present invention, the Internet/telephone adapter device mainly comprises: an interface module, a hybrid circuit, a modulation/demodulation means, an auto-detecting means, a digital signal processor, and a CPU. The auto-detecting means provides a mechanism to detect the communication type of an incoming call by means of the feature rings. The feature rings have a predetermined feature distinguishable from non-feature rings. Whenever the auto-detecting means determines the communication type of the incoming call, it sends a control signal to CPU. In response to the control signal, the CPU will automatically switch the linkage to the Internet or to the PSTNs without further human operations. More particularly, the operation for the adapter device is very easy. For the callee, he can answer any phone call without worrying about whether it is an Internet call or a conventional phone call. For the caller, he only need to press a predetermined function key before dialing the callee's phone number.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

In general, the conventional technology cannot distinguish the communication type of an incoming call from the tone of a ring because the tone of a ring is a uniform tone. Each ring is distinguishable from one another only in the sequence and the interval between two rings but not the tone itself. The interval between two rings, the duration of a ring, and the voltage of a ring are all regulated by a national central office. Whether an incoming call is from the Internet or the PSTNs, the rings must follow the national standard. That is why the users of the adapter device must make a notice call before they can actually talk to each other over the Internet.

Take the PSTNs standard in Taiwan as an example. If the caller and callee are both in Taiwan, then the interval between every two rings is within 4 seconds. So, following this rule, the present invention can detect if the communication type is a regular telephone call by sampling an interval between two rings. For instance, sample three consecutive rings. If the duration and the intervals of the three rings are the same, then they can be determined to be regular telephone communication type. On the other hand, the adapter device of the present invention defines a series of feature rings. The feature rings indicate the Internet communication type. For instance, the feature rings can be defined as three consecutive rings with each interval longer than 5 seconds and shorter than 15 seconds. Following this rule, the adapter device only need to sample three consecutive rings to determine if they are correspondent with such feature to determine if the incoming call is an Internet call. It should be understood that the feature defined hereinablove is only exemplary and shall not be treated as a limitation. The definition of the feature rings is dependent on practical application.

The adapter device of the invention also provides the functionality of call waiting, message recording, and also remote wakeup. For the caller, he only needs to press a predefined function key before dialing the callee's phone number to commence an Internet call. The subsequent procedures will be left to the adapter device to perform, including login the Internet, packets transmission, voice signal processing, logout the Internet, and call waiting. For the callee, the operation of receiving a call is exactly like a regular telephone.

Figure 1:
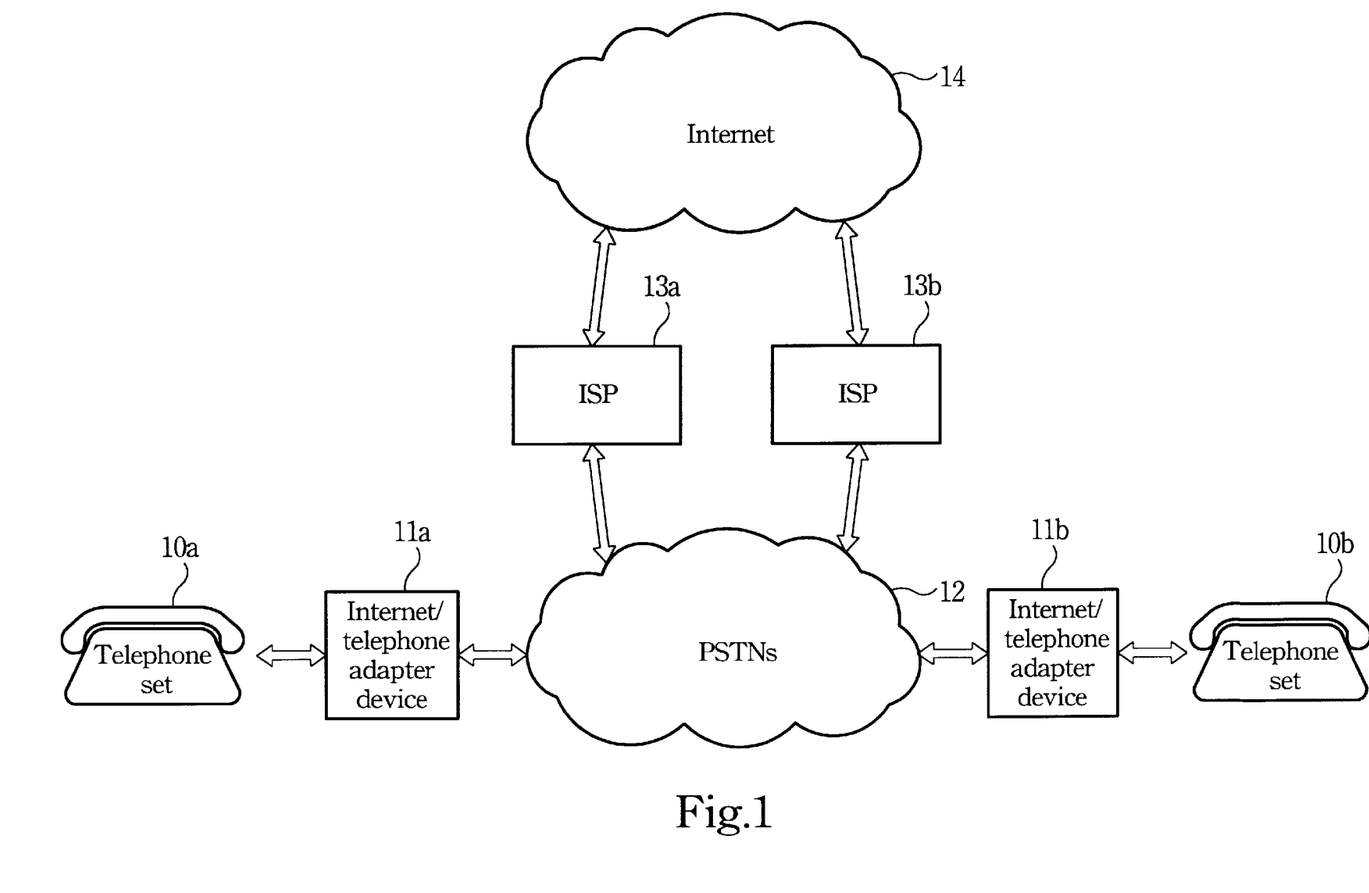
FIG. 1 is a schematic diagram showing the adapter device of the present invention.

Refer to FIG. 1 for showing the communication between the adapter device, the Internet, and the PSTNs. The adapter device of the present invention is like an add-on device to the telephone set 10a, 10b of the caller site and the callee site respectively. The inventive adapter device 11a, 11b each has a telephone line RJ-11 connector, and a telephone set RJ-11 connector for connecting to the telephone set 10a, and 10b. The adapter device 11a, 11b can access the Internet 14 via internet service provider 13a, 13b respectively. In most cases, the caller and callee uses the Public Switched Telephone Networks (PSTNs) 12 to connect to the ISP 13a, 13b. Since the connection between the PSTNs and the telephone set 10a, 10b is established by making a local phone call, so the cost on the Internet call is very low comparing to a long distance call or an overseas call.

Figure 2:
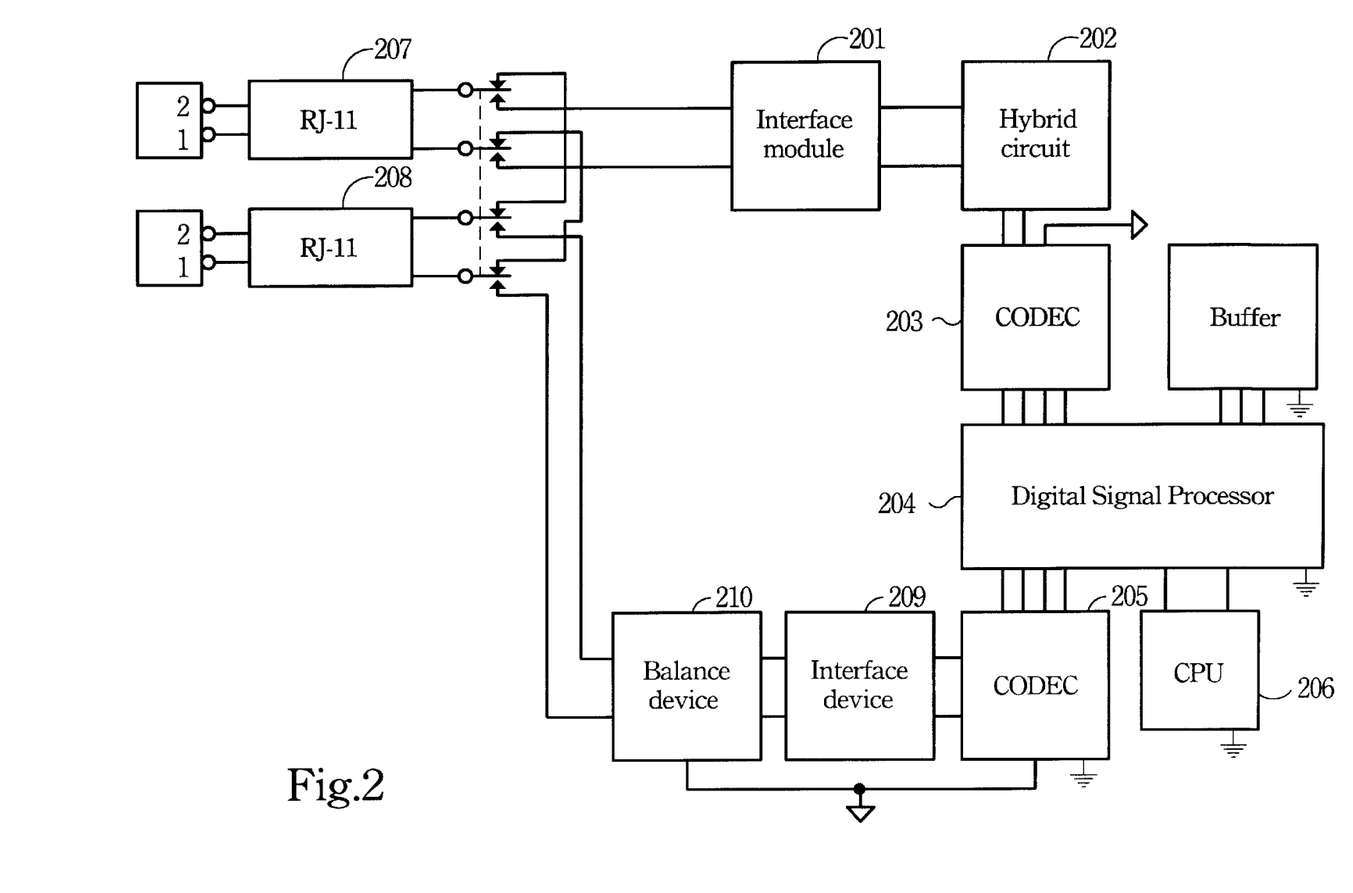
FIG. 2 is a functional block diagram showing a preferred embodiment of the present invention.

The functional block diagram of the adapter device according to the preferred embodiment of the present invention is illustrated in FIG. 2. It mainly comprises: an interface device 201, a hybrid circuit 202, an Analog to Digital and Digital to Analog Converter (CODEC) 203, a Digital Signal Processor (DSP) 204, a CODEC 205, and a Central Process Unit (CPU) 206.

The interface device 201 is coupled to the RJ-11 connector 207, 208 for connecting to the telephone line and telephone set respectively. The interface device 201 is mainly for receiving command signals and preconditioning the data signals from the telephone line and reducing the side tones. The interface device 201 is also responsible for sending command signals, such as reset, Off-Hook, ring back, and ring detect signals to the digital signal processor 204. Moreover, the interface device 201 provides the functions of signal protect when connecting to telephone lines of different frequencies and voltages. When receiving an incoming call, the interface device 201 sends a notifying signal to CPU 206.

The analog command signals and data signals are sent to the hybrid circuits 202. The hybrid circuit 202 amplifies the modulated signals, and converts the ring back signals to digital signals via CODEC device 203. Then, the digital ring back signals will be forwarded to the DSP 204.

Figure 3:
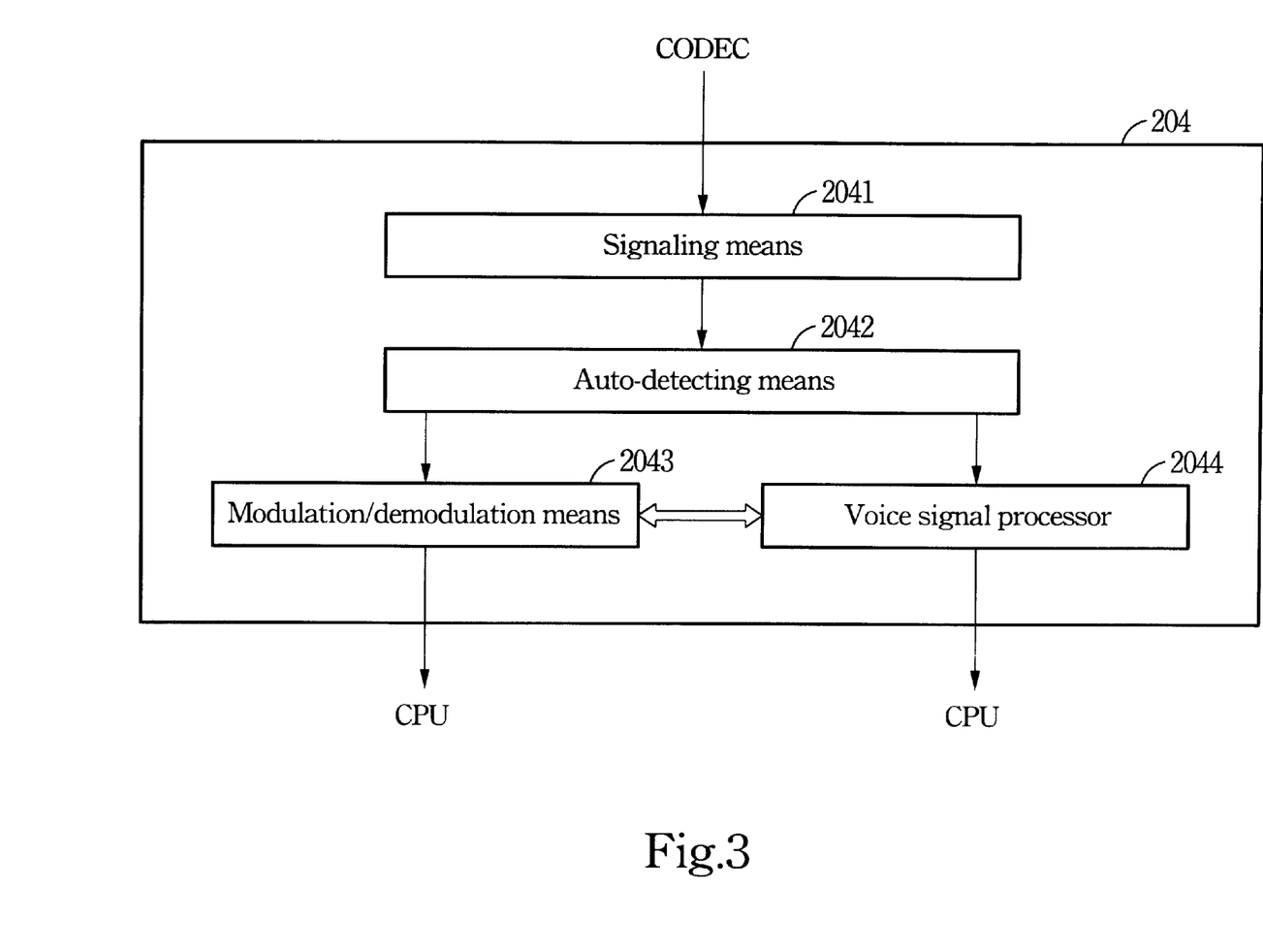
FIG. 3 is a functional block diagram showing another preferred embodiment of the present invention.

Refer to FIG. 3 for showing the structure of the DSP 204. The DSP 204 mainly comprises: signaling means 2041, auto-detecting means 2042, modulation/demodulation means 2043, and voice signal processor 2044. The signaling means 2041 is responsible for receiving the digital signals output of the CODEC 203, including the ring signals, and voice signals. When receiving the ring signals, the auto-detecting means 2042 determines the communication type of the incoming call according to the feature rings defined. For instance, if the sampled three consecutive rings have the intervals longer than 5 seconds and shorter than 15 seconds, then the incoming call can be determined to be from the Internet. Thus, the auto-detecting means 2042 sends a control signal to the modulation/demodulation means 2043 to commence login procedures and processing instructions and communication protocols. Modulation and demodulation means 2043 sends the processed data to the CPU 206 for login into the Internet. After successfully login to the Internet, the voice signal processor 2044 will compress the voice signals which will be forwarded to the CPU 206 to be packetized. The voice packets will then be sent to the Internet via modulation/demodulation module 2043.

If the sampling rings of the incoming call does not show any feature, then it is determined to be a regular telephone call. In such case, the auto-detecting means 2042 generates a control signal to the CPU 206 to switch to the regular telephone line linkage. Refer to FIG. 2 again. When the communication type is a regular telephone communication, the DSP 204 will send the voice signals to the CODEC 205 for converting the digital data signals to analog data signals and then transmit the voice signals to the telephone set via a balance device 209 and an interface device 210.

The main function of the CPU 206 is for signal identification in response to the detection result of the auto-detecting means 2042. When the detection result indicates the incoming call is from the Internet, the CPU 206 will perform Internet login procedure. On the other hand, when the detection result indicates the incoming call is a regular telephone call, the CPU 206 will switch the communication linkage to a regular telephone line. Moreover, the CPU 206 also can response to call waiting message and perform Internet logout procedures.

According to the architecture as shown in FIG. 2, the preferred embodiment of the present invention does not require an external MODEM because the role of MODEM is replaced by DSP 204. Consequently, the cost on the hardware implementation of MODEM can be saved.

The operations of the present invention can be illustrated more clearly according to the caller and callee respectively. First, refer to FIGS. 4A and 4B for the operations of the caller.

Figure 4A:
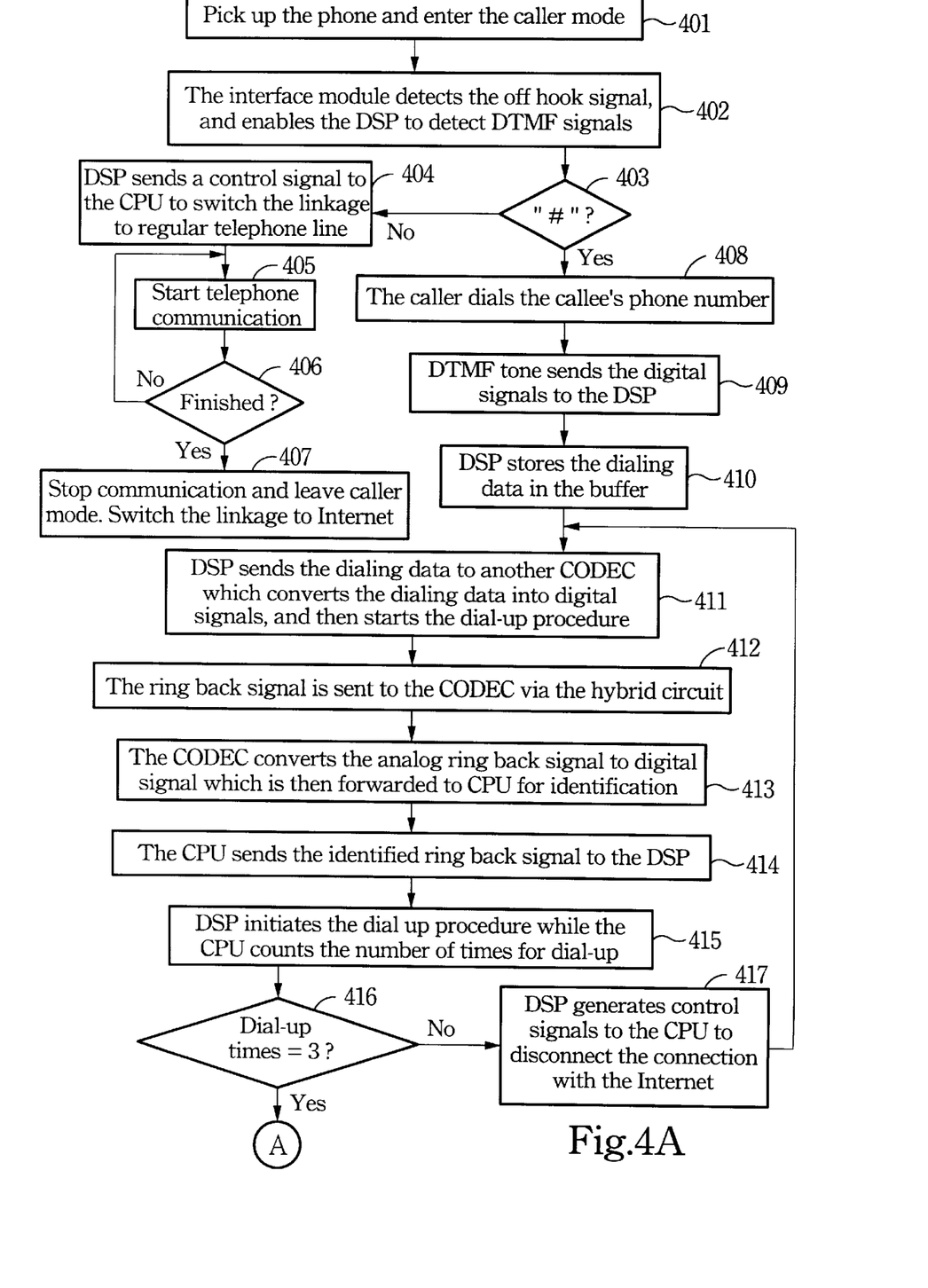
FIGS. 4A–4B is a flowchart showing the method of the present invention.

401: When the caller wants to make a call, he can enter the caller mode by simply picking up the phone.

402: The interface of the caller detects the off hook signal, and enable the DSP to detect DTMF (Dual Tone Multi Frequency) signals.

403: If the caller presses a predefined function key, such as "#" to request an Internet call, then go to step 408. Otherwise, go to step 404 for regular telephone communication.

404: Since the caller does not want to communicate via Internet, so the DSP sends a control signal to the CPU to switch the linkage to a regular telephone line.

405 : Start communication.

406 : Determine if the communication is finished? If yes, go to step 407. If not, go to step 405.

407: Stop communication and leave caller mode. Switch communication linkage to Internet.

408: From the predefined function key, the auto-detecting means can determine to make an Internet call. Then, the caller dials the callee's phone number.

409: DTMF tone sends the digital signals to the DSP via the CODEC after converting the analog signals to the digital signals.

410: DSP stores the dialing data in the buffer.

411: DSP sends the dialing data to another CODEC which converts the dialing data into digital signals, and then starts the dial-up procedure.

412 : The ring back signal is sent to the CODEC via the hybrid circuit.

413 : The CODEC converts the analog ring back signal to digital signal which is then forwarded to CPU for identification.

414 : The CPU sends the identified ring back signal to the DSP.

415: DSP initiates the dial up procedure while the CPU counts the number of times for dial-up.

416 : Determine if the number of dial-up times is equal to a predetermined number, such as three times. If yes, go to step 418, if not, go to step 417.

417: Since the number of dial-up times is not equal to a predetermined number, it indicates that the dial-up procedure is not successful. So, the DSP generates signals to the CPU to disconnect the connection with the Internet, and go to step 411 again.

Figure 4B:
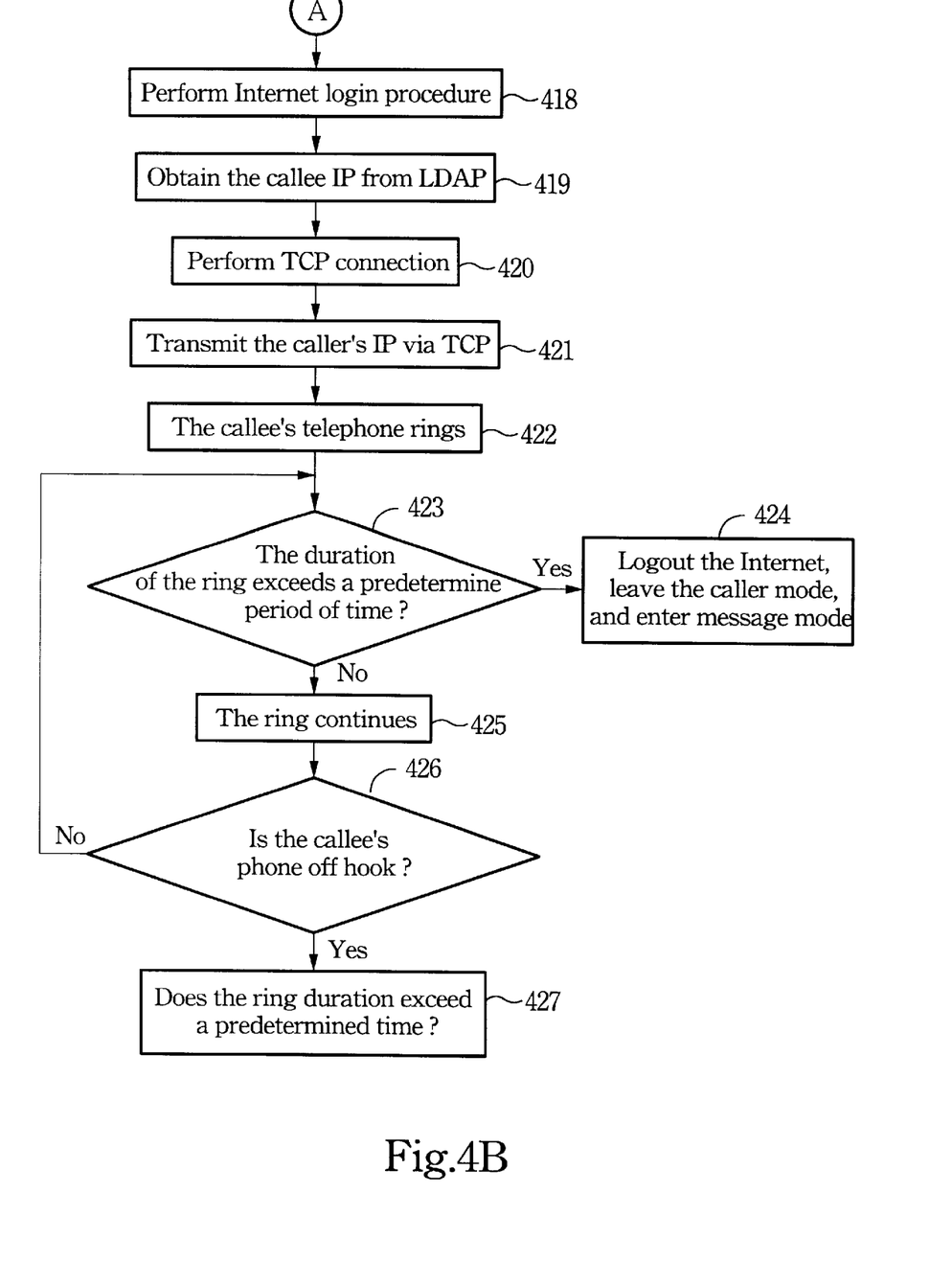

418: Since the number of dial-ups is equal to a predetermined number of times, it indicates that the login procedure is successful, so execute login procedure.

419: Obtain the callee IP from LDAP (Lightweight Directory Access Protocol).

420: Start TCP (Transmission Control Protocol) connection.

421: Transmit the caller's IP via TCP.

422: The callee's telephone rings.

423: Determine if the duration of the rings exceeds a predetermine period of time? If yes, go to step 424. Otherwise, go to step 425.

424 : Logout the Internet, leave the caller mode, and enter message mode.

425: The ring continues.

426: Determine if the callee's phone is off hook? If yes, go to step 427, otherwise go to step 425.

Figure 5:
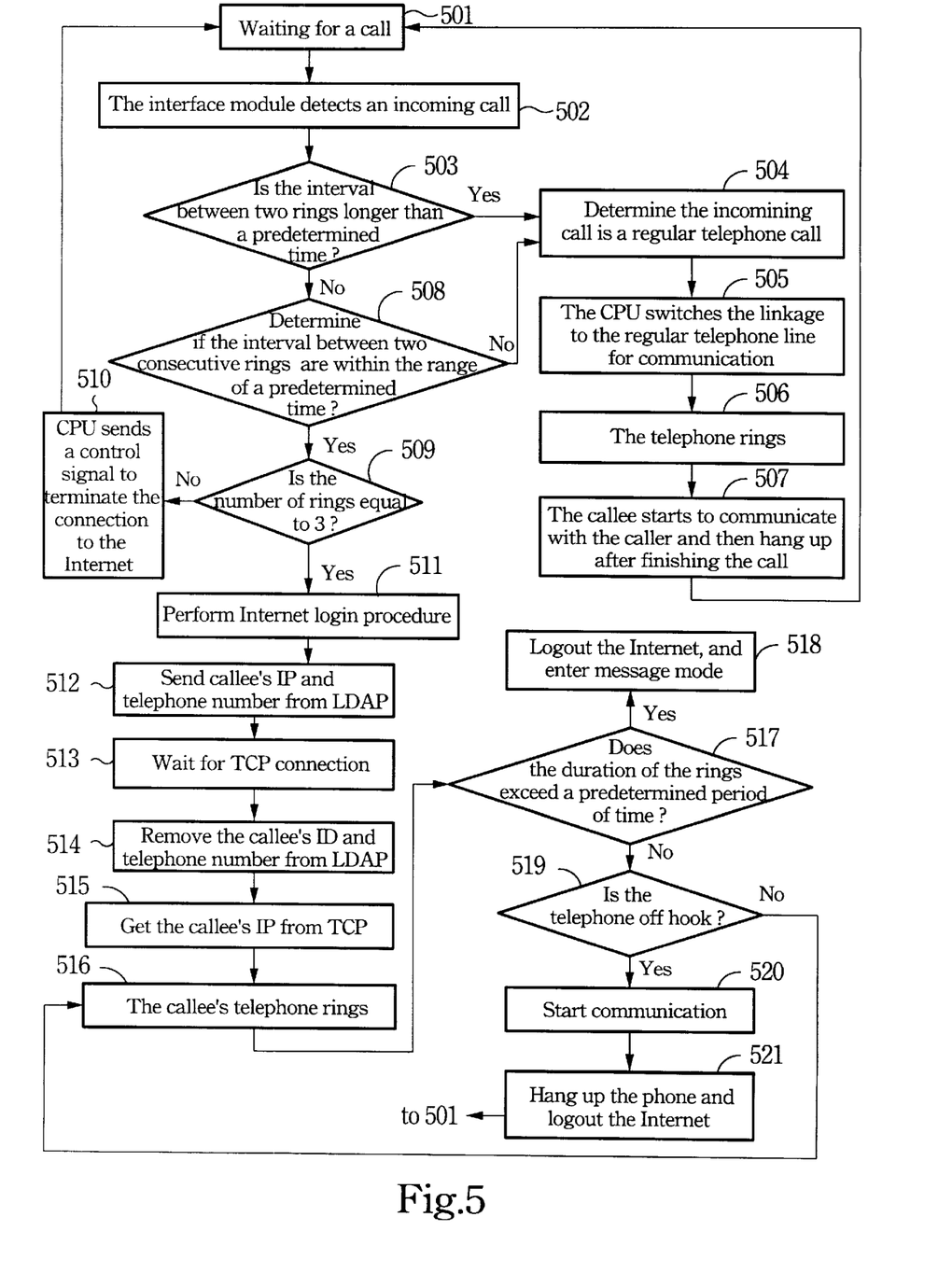
FIG. 5 is a flowchart showing the method of the present invention.

427: Determine if the ring duration exceeds a predetermined time? If yes, go to step 426. Otherwise, go to step 423. Corresponding to the operation of the caller, the operation of the callee is illustrated in FIG. 5.

501: Suppose the callee's phone is hang up and waiting for phone call.

502: The telephone interface detects an incoming call.

503: The DSP of the callee's telephone detects if the interval between two rings is longer than a predetermined time? If yes, go to step 504. If not, go to step 508.

504: Determine the incoming call is a regular telephone call, so provide it with the first priority.

505: The CPU switches the linkage to the regular telephone line for communication.

506: The telephone rings.

507: The callee starts to communicate with the caller and then hang up after finishing the call. Go to step 501.

508: Determine if the interval between two consecutive rings are within the range of a predetermined time? If yes, it indicates it is an Internet call, so go to step 509. If not, go to step 504.

509: Determine if the number of rings is equal to a predetermined number of times, such as three times. If yes, go to step 511. If not, go to step 510.

510: Since the number of dial-up times is not equal to a predetermined number of times, it indicates the dial-up procedure is not successful yet. Therefore, the CPU sends a control signal to terminate the connection to the Internet, and go to step 501 again.

511: Since the number of dial-up times is equal to a predetermined number, it indicates the dial-up procedure is successful. So, perform Internet login procedure.

512: Send callee's IP and telephone number to LDAP.

513 Wait for TCP connection.

514: Remove ID and telephone number from LDAP.

515: Get the callee's IP from TCP.

516: The callee's telephone rings after the connection to the Internet has been established.

517: Determine if the duration of the rings exceed a predetermined period of time? If yes, it indicates that no one answers the phone, so go to step 518. If not, go to step 519.

518 Logout the Internet, and enter message mode.

519: Determine if the telephone is off hook? If yes, go to step 520. If not, go to step 516.

520: Start communication.

521 After the communication is complete, hang up the phone and logout the Internet.

For the callee site, whenever the callee hears the telephone ring, he can simply pick up the phone without having to worry about whether it comes from the Internet or the PSTNs because the communication type has already been automatically detected and processed. Moreover, the adapter device of the present invention is very user friendly. It does not require any further configuration. The user only needs to plug in the telephone line and the telephone set. Hence the above described invention can successfully meet the objectives of the invention.

It should be understood that various alternatives to the structures described herein may be employed in practicing the present invention. It is intended that the following claims define the invention and that the structure within the scope of these claims and their equivalents be covered thereby.

What is claimed is:

1. An Internet/telephone adapter device comprising:

interfacing means connected to a telephone line for bidirectionally transferring voice signals and command signals from said telephone line, and generating a notifying signal in response to a ring signal;

a hybrid circuit coupled to said interfacing means for transferring a ring-back signal obtained from said command signals;

first converting means coupled to said hybrid circuit for converting said command signals, said voice signals, and said ring back signal into digital command signals and digital voice signals, and digital ring-back signal;

a digital signal processor (DSP) coupled to said first converting means comprising:

a signaling means for receiving digital signals input from said first converting means;

auto-detecting means for determining a communication type of an incoming call and generating a detection result;

modulation/demodulation means for processing said digial command signals and said digital voice signals and performing Internet communication in response to said detection result;

means for processing said digital voice signals;

second converting means coupled to said digital signal processor for converting said digital voice signals, said digital command signals output from said digital signal processor into analog signal processor; and a central process unit (CPU) coupled to said digital signal processor for controlling a linkage between said telephone line and said internet in response to said detection result.

2. The Internet/telephone adapter device as claimed in claim 1, further comprising:

a case having two connectors for connecting to a telephone line and a telephone set respectively.

3. The Internet/telephone adapter device as claimed in claim 1, wherein said CPU switches said linkage between said telephone line and said internet by means of:

switching said linkage to a telephone line when said detection result indicating a telephone communication;

connecting to said Internet when said detection result indicating an Internet communication;

sending said voice signals output of said digital signal processor when said detection result indicates the start of the communication; and disconnecting said Internet communication when said detection result indicates a termination of communication.

4. A method for auto-detecting a communication type of an incoming call, comprising the steps of:

auditing an incoming call;

determining if the sampled consecutive rings having intervals each longer than a predetermined period of time;

determining said incoming call as an Internet call when said sampled consecutive rings having intervals shorter than said predetermined time, and complying with a predetermined feature;

connecting to said Internet when the communication type of said incoming call is determined to be an Internet call;

starting communication after connecting to said Internet; and disconnecting said Internet communication when said communication is finished.

5. The method as claimed in claim 4, wherein said incoming call is determined to be a telephone call when said sampled consecutive rings having intervals each longer than said predetermined time.

6. The method as claimed in claim 4, wherein said feature rings are consecutive rings having intervals each ranging from 5 seconds to 15 seconds.

7. The method as claimed in claim 4, wherein said predetermined period of time is 4 seconds.

8. The method as claimed in claim 4, further comprising the steps of:

performing a dial-up procedure at the caller site;

determining the communication type of said dial-up procedure;

performing regular telephone communication when said dial-up procedure is determined to be a regular telephone call;

performing Internet login procedure when said dial-up procedure is determined to be an Internet call;

waiting for a response from a callee;

starting communication when said callee responses; and performing Internet logout procedure when said communication is finished.

9. The method as claimed in claim 8, wherein said caller presses a predetermined function key prior performing said Internet communication.

10. A method for auto-detecting a communication type of an incoming call, comprising the steps of:

a caller site:

performing a dialing procedure;

determining the communication type requested by the caller;

performing regular telephone communication when determining said caller requests a regular telephone communication;

performing Internet login procedure when determining said caller requests an Internet communication;

waiting for a callee's response;

start communication when said callee responses; and performing logout procedure when said communication terminates;

a callee site:

waiting for an incoming call;

determining if sampled consecutive rings having intervals each being longer than a predetermined period of time;

determining said incoming call is a telephone call when said sampled consecutive rings having intervals each being longer than said predetermined period of time;

determining said incoming call as an Internet call when said sampled consecutive rings having intervals each being shorter than said predetermined period of time, and complying with a predetermined feature;

connecting to said Internet when said incoming call is determined to be an Internet call;

starting communication after connecting to said Internet; and logout from said Internet when said communication is finished.

11. The method as claimed in claim 10, wherein said predetermined period of time is 4 seconds.

12. The method as claimed in claim 10, wherein said feature rings is three consecutive rings having intervals each ranging from 5 seconds to 15 seconds.

13. The method as claimed in claim 10, wherein said step of determining if said caller requests an Internet communication is by determining if said caller presses a predetermined function key prior to dialing said callee's phone number.

* * * * *